Jan. 3, 1967 J. HENRY-BAUDOT 3,296,474
PRINTED-CIRCUIT MULTILAYER WINDING FOR ELECTRIC ROTARY MACHINES
Filed Aug. 6, 1963 2 Sheets-Sheet 1

Inventor: Jacques Henry-Baudot
By Kenmon, Palmer, Stewart & Estabrook
Attorneys

United States Patent Office 3,296,474
Patented Jan. 3, 1967

3,296,474
PRINTED-CIRCUIT MULTILAYER WINDING FOR ELECTRIC ROTARY MACHINES
Jacques Henry-Baudot, Antony, France, assignor to Printed Motors Inc., New York, N.Y.
Filed Aug. 6, 1963, Ser. No. 300,287
5 Claims. (Cl. 310—268)

The present invention concerns improvements in or relating to windings made of printed-circuit conductors for electric rotary machines wherein they act mainly as armatures, by "printed-circuit" conductors, it is intended to include any conductors and circuits made of flat and thin conductors bonded to an insulating surface and formed by any technique producing repetitive patterns of electrical conductors on insulating surfaces.

In such machines, whether with axial or radial magnetic airgaps, such armature windings are located entirely within the said airgaps and in view of increasing the overall efficiency from an electrodynamic point of view, it has already been proposed to make multilayer windings by stacking two-face windings together and providing certain interconnections between their conductors. However, for instance in French Patent No. 1,236,528 filed April 30, 1959, in the name of Normacem, it has been provided to stack and interconnect two windings, one of the series-waves type and the other one of the lap wound type so that the electrical circuit comprises several spirals of the lap wound winding connected between the turns of the series-wave winding. For making such a "sandwich", applicant has further provided a method of interconnection disclosed in French Patent No. 1,256,632 filed February 9, 1960 in the name of Societe d'Electronique et d'Automatisme, applicable to disc-shaped sandwiches as well as to cylindrical ones such as known under the generic denomination of Brown armatures.

Such multilayer windings however present a drawback from a mass-production standpoint in that they need at least two distinct patterns of the half-turn conductor layers, one for the series-wave winding and the other one for the lap wound winding. An object of the present invention is to avoid such a drawback and to provide a multilayer winding of printed-circuit conductors necessitating a single pattern for each and any face of the sandwich, and consequently a single master drawing for the printing operations of such a sandwich. It is a further object of this invention to provide such a multilayer winding utilizing patterns of the series-wave type only for each winding thereof.

In a printed-circuit conductor winding, the conductors adhere to an insulating carrier and their ends to be interconnected comprise peripheral rows of terminals near the edges of said carrier. The circuit of such a winding follows successive spiral wherein the half-turn conductors are alternately on one face and the opposite face of said carrier, the half-turn conductors of each pair of successive conductors on opposite faces substantially encompassing an area corresponding to the area of a magnetic pole of the field structure. This series of spirals, after a number of paths on the carrier, which is a function of the number of the conductors per pole and consequently of the number of poles provided in the machine embodying such winding, is connected to form a closed winding circuit pattern. In known multilayer windings, each elementary winding is made complete in itself prior to the assembly of the sandwich. In contradistinction thereto, it is an object of this invention so to provide windings of multilayer printed circuit conductors which are to be completed only after the assembly of the layers.

In accordance with the present invention each layer of a multilayer armature has an identical pattern of conductors. There are always an even number of layers and while the specific embodiment hereinafter described relates to a four-layer assembly, it will be apparent to those skilled in the art that the number of layers may be increased to any desired number in multiples of two. While the pattern of conductors on each layer is identical, those on opposite faces of the same insulating member are reversed in orientation. In a four-layer winding, end portions of the conductors at one edge of the first and fourth layers and end portions at one edge of the second and third layers are electrically interconnected. Likewise, the end portions of the conductors at the other edge of the first and second layers and the end portions of the conductors at the other edge of the third and fourth layers are electrically interconnected with the result that the thus interconnected layers form a series wave winding, the series circuit of which passes from layer to layer in succession. There is thus defined a single uninterrupted series wave winding.

In order to detail the invention, reference will be made to an illustrative embodiment thereof from which any variation can be deduced for other number of conductors and pitches as well as for other number of elementary windings. In order to simplify the drawings, this example relates to a disc-shaped winding for an axial airgap machine, but the adaptation to a cylindrical winding for radial airgap machine is obvious per se, from mere anamorphosis of flat and circular surfaces to cylindrical surfaces.

In the accompanying drawings, FIG. 1 shows a somewhat simplified cross-section of a multilayer armature machine;

Figure 1:
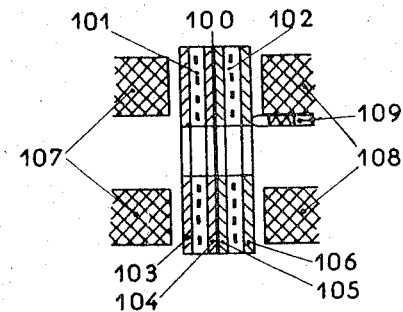

As shown in FIG. 1, the example of multilayer winding concerned comprises two elements, one comprising the layers of conductors 103 and 104 bonded on the opposite faces of an insulating sheet 101, the other one comprising the conductor layers 105 and 106 bonded on the opposite faces of an insulating sheet 102. These elementary windings are assembled together by a film adhesive layer 100. Interconnections must be made between the layers of each elementary winding as well as between said elementary windings. Such an armature may be mounted between, for instance two sets of magnetic poles such as 107 and 108. One of said sets may be replaced by a mere magnetic yoke for closing the flux from the remaining field magnet arrangement. Brushes such as 109 can be applied against at least one face of the armature for translating current thereto.

Figure 2:
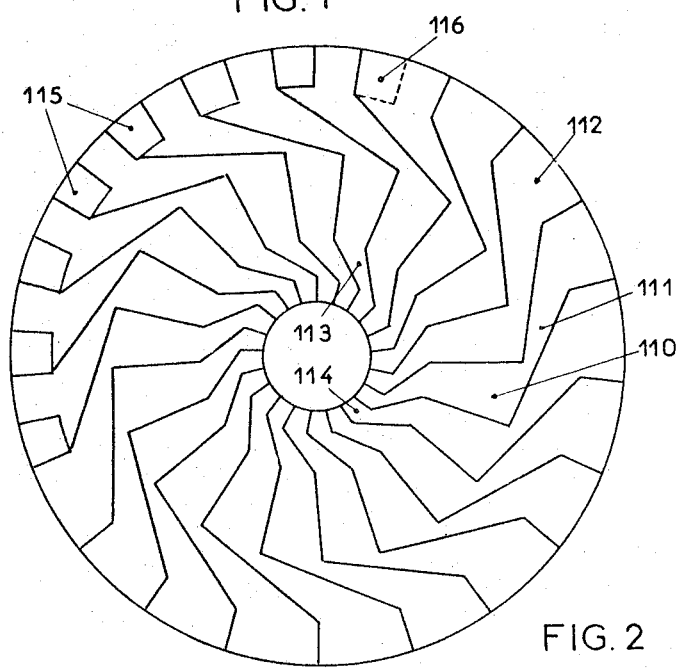
FIG. 2 is a front view of the master drawing for printing any face of the winding.

The described and shown example comprises eighty-four conductors, consequently twenty-one conductors per layer or face. It is designed for a six-pole machine. Each layer of winding conductors, except for the interconnections is identical in each of said four layers and the pattern is shown on FIG. 2. Each half-turn conductor comprises for instance a mid-portion 110 extended at both ends by slanted portions 111 and 113 ending in terminals 112 and 114. Seven of said terminals, for instance at the outer edge, are subdivided on one-half of their radial angular span for defining thereat such separate conductor areas 115. An eighth terminal might also be subdivided for defining a further separate conducting area as shown in dot line at 116.

Figure 4:
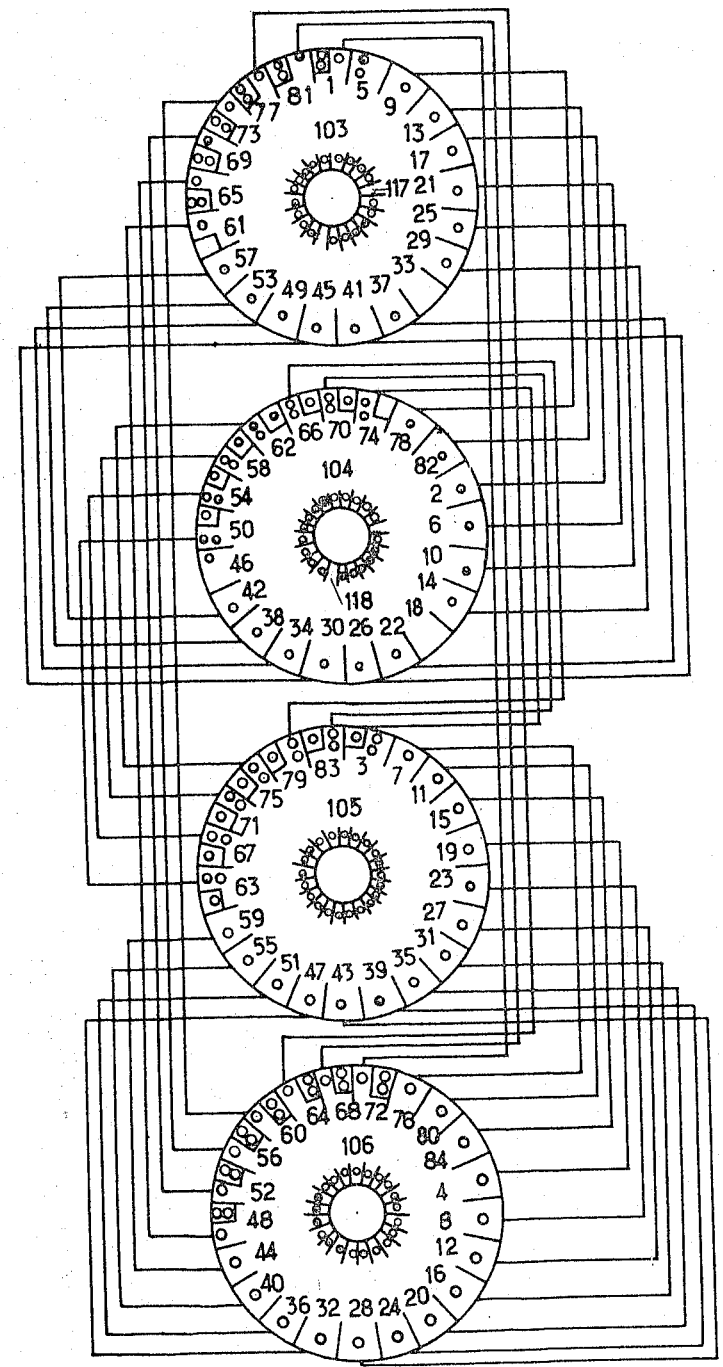

The four layers of half-turn conductors are shown on FIG. 4 with a numbering of the terminals corresponding to the location of the half-turn conductors in the complete four face pattern. These faces or layers are shown one under the other in FIG. 4 for the sake of clarity of the explanation. Their relative positions in the sandwich are indicated. The conductors are only indicated by their end terminals and it is to be understood that the orientation of the slanted portions of the conductors are reversed from one layer to the other one, from layer 103 to layer 104 and from layer 105 to layer 106. The orientations are the same in layers 103 and 105 on the first part, in layers 104 and 106 on the other part.

Figure 3:
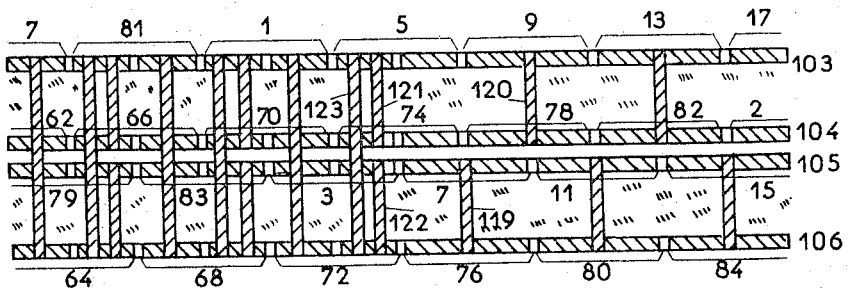
FIG. 3 is a partial cross-section view, linearly developed for the sake of simplicity, of the elementary two winding armature of the example; and, FIG. 4 shows a schematic view of the interconnections between the four faces of said elementary two winding armature.

The interconnections are shown in the diagram of FIG. 4 external to the layers in order to clearly follow them. It is to be understood that such interconnections are made by the hole metallization technique and, for better understanding these interconnections, one will refer to the cross-section view of FIG. 3, assumed to be taken along one outer edge of the sandwich at the place of the interconnections in a developed planar view. Any plain interconnection between conductors in layers 103 and 104 can be made in the middle of the registering terminals such as for instance connection 120 between conductors 9 and 78 as shown in FIGURE 3. Similar simple connections are established in layers 105 and 106 such as for instance connection 119 between conductors 7 and 76. For connecting together two conductors of the layers 104 and 105, two steps are necessary: first connections are made between separate divisions of extreme faces 103, respectively 106 to the terminals of the intermediary faces 104 and 105, respectively, as shown for instance for connection 121 between 5 and 74 in the upper elementary winding and for connection 122 between 3 and 72 in the lower elementary winding; secondly, and after assembly of the elementary windings, through-connections are made through the sandwich between the registering extreme areas, see for instance connection 123 connecting the separate conductive area of terminal 5 to the separate conductive area of terminal 72. As explained by the patent of Societe d'Electronique et d'Automatisme which has been referred to, such a connection as 123 cannot definitely connect the intermediate conductive areas through which it passes, and such double connections are necessary for obtaining a safe electrical connection between extreme terminals in a sandwich, themselves safely connected to corresponding intermediate terminals in such a sandwich. After the assembly, through-connections may be made for connecting conductive areas on the opposite faces of the sandwich, such as shown for instance between parts of terminals 81 and 68 and accordingly the intermediate conductive areas passed through by such a connection will not be electrically connected to said opposite face areas.

In FIG. 4, no connections are provided in the inner rings of terminals between 117, layer 103 and 118, layer 104, and in the outer rings of terminals between 33, layer 103 and 18, layer 104. Consequently no connections exist between conductors 5 and 18, 18 and 33, and 33 and 46 for reasons which will be explained below.

The layer 103 comprises conductors 1, 5, 9 . . . 81; the conductors 5 to 57, inclusive, have undivided terminals, the conductors 61 to 1 have their terminals divided for providing conductive areas electrically separate from the conductors. The layer 104 comprises conductors 2, 6 . . . 82; the conductors 78 to 46 have undivided terminals, and the conductors 50 to 74 have terminals divided for providing conductive areas separate from said conductors. From layer 103 to layer 104 there exists an angular shift by one terminal in the registration of the subdivided ones of said terminals. The conductors of the layer 105 are numbered 3, 7 . . . 83 and the conductors of the layer 106 are numbered 4, 8 . . . 84. Terminals 63 to 3 are subdivided in layer 105, conductor terminals 48 to 72 are subdivided in layer 106. A shift of one-half terminal is provided between the elementary winding 103–104 and the elementary winding 105–106. With the connections as indicated the winding diagram may be followed easily, the progression from conductor to conductor in passing from one face to the other at the outer edge being 13 and the progression from conductor to conductor in passing from one face to the other at the inner edge being 15 with repetition of the 13 progression when passing from one elementary winding to the other one. This diagram is as follows:

On the upper element, a first spiral passes from conductor 1, layer 103, to conductor 14, layer 104, to conductor 29, layer 103, to conductor 42, layer 104, to conductor 57, layer 103, to conductor 70, layer 104;

From the conductor 70, is reached the conductor 83 in layer 105, from repetition of the progression of 13 in passing from the upper to the lower elementary winding member; a second spiral then passes from 70 to 83, layer 105, to 12, layer 106, to 27, layer 105, to 40, layer 106, to 55, layer 105, to 68, layer 106;

Back to the first elementary winding member through the connection between 68 to 81, layer 103, a third spiral passes through conductors 81, 10, 25, 38, 53 and 66; from 66 the winding circuit passes to the lower elementary winding member, conductor 79 and the fourth spiral includes the series connection of conductors 79, 8, 23, 36, 51 and 64; from 64, the winding passes anew to the first elementary winding member whereon the fifth spiral includes the series connection of conductors 77, 6, 21, 34, 49 and 62; from 62 is reached conductor 75 of the lower elementary winding member whereon the sixth spiral comprises the series connection of conductors 75, 4, 19, 32, 47 and 60; from 60, the the next spiral is traced on the upper member through conductors 73, 2, 17, 30, 45 and 58; from 58, the lower member is reached once more for a spiral comprising conductors 71, 84, 15, 28, 43 and 56; the ninth spiral starts from conductor 69 connected to 56 and its circuit passes through conductors 82, 13, 26, 41 and 54 from which, changing again of member, from 54 and 67, the following spiral presents a circuit through conductors 80, 11, 24, 39 and 52; conductor 52 is connected to conductor 65 and the following spiral passes through conductors 65, 78, 9, 22, 37 and 50, this latter connected to conductor 63 from which starts the twelfth and last spiral through conductors 76, 7, 20, 35 and 48.

From 48, the circuit passes again to the upper elementary winding member at conductor 61 connected to conductor 74 but, at this point, instead of tracing again a spiral on said upper member, the circuit passes immediately back to the lower member, conductor 3 and on this second member a further spiral is followed through 16, 37, 44, 47 and 72. Conductor 72 on layer 106 is through-connected to conductor 1, layer 103, which closes the complete winding pattern.

For the connection between 74 and 3, the terminal of conductor 5, layer 103 has been used without inconvenience since this conductor 5 is not connected to conductor 33 which, in turn, is not connected to conductor 46, the terminal of which is passed through by another connection. This means that in the complete winding member, four conductors are not used, which is without inconvenience in a series-wave pattern. In conventional wiring of such patterns, it is usual to leave conductors if not "sections" dead. As a modification however, an eighth terminal has been divided as shown in dot line on FIG. 2 on each layer of conductors. In the assembly, such a terminal would occupy the position numbered as 5 in layer 103, 46 in layer 104 (which would bring back in registration of angular positions with respect to such divided terminals the layers 103 and 104), and the positions numbered 7 and 48 in layers 105 and 106. The connections between 103 and 104 would then be made at 117 and 118 and the connection between 103 and 104 would have been made between terminals 33 and 18. This would lead to a complete dead section from conductor 5 to conductor 46 when, in layers 105 and 106 the connections would be made from face to face in the divided areas remaining connected to the conductors of same numbering. Such a modification giving the same result as the completely described one, is obviously part of the invention too.

The above described example considers a winding having a recessive progression in that, starting from conductor numbered 1 a complete turn of a spiral would come back to the same conductor 1 on the first elementary winding member if a repetition of the progression of 13 had not been provided for passing to the second elementary winding member in the sandwich. Actually, the overall progression rated (outer plus inner progression rate) is made equal to $4n/p$, with $n$ denoting the number of conductors per layer and $p$ denoting the number of pairs of poles in the machine, identical to the number of double polar pitches). One might have used a progressive character winding instead, made equal to $(4n+4)/p$, whereby the first spiral would have ended at conductor 5 in the absence of a passage to the second member with a repetition of progression rate similar to the one disclosed for the recessive arrangement for a connection to conductor No. 3 of the second member; the next spiral would have then come back to conductor No. 5 of the first member, and so forth. It is then clear that the use of a progressive arrangement instead of a recessive one does not change the fashion of putting the invention into practice.

In all cases, the complete winding closes after a number of spirals on one elementary winding member equal to the number of odd conductors per double polar span, i.e. a number equal to $n/p$ (or the immediately superior integer number if $n$ is not divisible by $p$). In the final spiral there are $(2p-2)$ dead conductors, i.e. conductors not serially connected in the complete winding circuit. For $p=3$, which is the above disclosed example, there consequently were four dead conductors; for $p=4$, there would be six dead conductors, for $2=p$, two dead conductors, 0 dead conductors for a single pair of poles, and so forth.

More than two elementary winding members may be assembled in a sandwich according to the invention; for instance, considering three members, terminals would be subdivided into three conductive areas, one remaining connected to a conductor, the two others being separate from said conductor and from one another; the three members would be assembled with a relative angular shift of one-third of a terminal. For passing from one member to the next one, a rear layer conductor of the first member would be connected to a front conductor of the second, and a rear conductor of the second would be connected to a front conductor of the third member and, finally, a conductor on the rear face of the third elementary winding member would be connected to a front conductor of the first member, according to a uniform cycle of permutation of said members in the series circuit pattern of the complete winding.

What is claimed is:

1. An electrical rotating machine printed-circuit armature winding comprising an even number greater than two separate layers of half-turn conductors, the conductors in one half of the number of layers being reversely oriented with respect to the conductors in the other half of the number of layers, said conductors being interconnected to form a single uninterrupted series-wave winding.

2. An electrical rotating machine printed-circuit winding according to claim 1 comprising an even number of layers of conductors at least equal to four, the conductors in each layer forming identical patterns except that the orientations of the conductors in alternate layers are reversed, end portions of the conductors at one edge of the first and fourth layers and end portions at one edge of the second and third layers being electrically interconnected, end portions of the conductors at the other edge of the first and second layers and end portions of the conductors at the other edge of the third and fourth layers being electrically interconnected, to form a series wave winding whose series circuit passes from layer to layer in succession.

3. The combination defined by claim 1 in which said half-turn conductors in each layer are formed in a series wave pattern.

4. A disc type laminated armature comprising an even number of layers of conductor segments at least equal to four, the conductor segments in each layer forming identical patterns but with the conductor segments in alternate layers being reversely positioned, tab portions at the inner and outer ends of each of said conductor segments, means electrically connecting said tab portions at the outer ends of said conductor segments in the first and fourth layers, means electrically connecting the tab portions at the outer ends of said conductor segments in the second and third layers, means connecting tab portions at the inner ends of said conductor segments of the first and second layers, means electrically connecting the tab portions at the inner ends of said conductor segments in the third and fourth layers, and the electrical connections of all of said tab positions forming a single uninterrupted wave winding with said conductor segments in each of the layers connected in series alternately from said first layer to said second layer to said third layer to said fourth layer to said first layer.

5. A disc type laminated armature comprising four layers of conductor segments, each conductor segment comprising a substantially straight central portion extending at an angle relative to a radial line, curved oppositely extending end portions, radially extending tab portions on each of said conductor segments at the outer and inner periphery of said armature, slot means separating said conductor segments in each layer, the conductor segments in each layer forming identical patterns but with the conductor segments in alternate layers being reversely positioned, the tab portions at the outer periphery of the first and fourth layers being electrically connected, the tab portions at the outer periphery of the second and third layers being electrically connected, the tab portions at the inner periphery of the first and second layers being electrically connected, the tab portions at the inner periphery of the third and fourth layers being electrically connected, and the electrical connections forming a wave winding with conductor segments in each of said layers connected in series alternately from said first layer to said second layer to said third layer to said fourth layer to said first layer.

References Cited by the Examiner
UNITED STATES PATENTS 3,095,516    6/1963    Moressee et al. _____ 310—268
3,096,455    7/1963    Hahn _____ 310—268

MILTON O. HIRSHFIELD, *Primary Examiner.*

ORIS L. RADER, *Examiner.*

J. J. SWARTZ, L. L. SMITH, *Assistant Examiners.*